E. M. PITMAN.
STAVE JOINTER.
No. 16,746.
Patented Mar. 3, 1857.
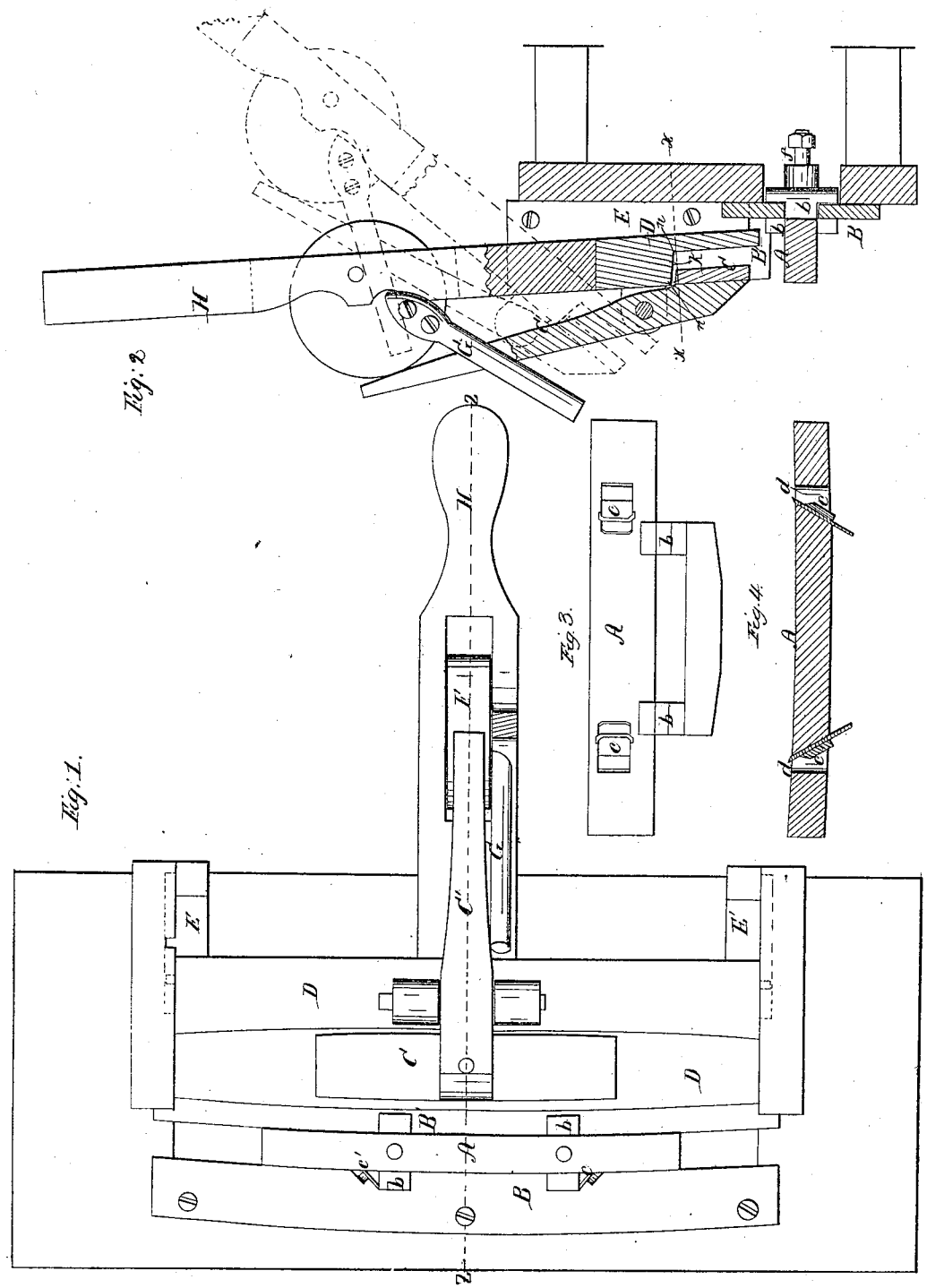

UNITED STATES PATENT OFFICE.

ERASMUS M. PITMAN, OF WARREN COUNTY, VIRGINIA.

MACHINE FOR BEVELING AND JOINTING STAVES.

Specification of Letters Patent No. 16,746, dated March 3, 1857.

*To all whom it may concern:*

Be it known that I, ERASMUS M. PITMAN, of the county of Warren, in the State of Virginia, have invented a new and useful Machine for Jointing Staves; and I do hereby declare that the following is a full, clear, and exact description of the construction and operation of the same, reference being had to the annexed drawings, making a part of this specification, in which—

Figure 1, is a top view, Fig. 2 is a transverse section, Fig. 3 is a back view of the plane A, Fig. 4 is a horizontal section of the plane A.

Fig. 1 consists of the following parts, A, a circular plane having reversed bits $c$, $c'$, and moving in a reciprocal manner on the guides B, B' which are attached to a suitable table, also the carriage D, the clamp C, C', the cam F, and the handle H, all of which are combined and moved upon, and in the ways E, E', so as to bring the ends of the carriage D at equal distances from the edge of the bits, when the plane is in motion, by which means the staves are gaged to an equal width; and given the required bevel. The carriage D, is constructed so as to give the upper stave, when more than one is jointed at a time the same width, of the lower one, by constructing the back of the carriage D (represented at $y$, in Fig. 2), so that the line $y$, at the top and bottom N, N' is equally distant from the top and bottom of the bits $c$, $c'$.

The operation is as follows, the plane being set in motion by a pitman, so as to make the bits move from the center outward to the ends of the carriage ways, and the carriage drawn back and dropped down by means of a slot in the side of the ways and the pins in the ends of the carriage D, represented by the dotted lines on the ways E, E', and the red tracings in Fig. 2. The operator places a bunch of staves between the carirage D, and the clamp C, and fastens it with the cam F, moves the carriage down the ways E, E', until the staves are sufficiently jointed returns the carriage up the inclined ways again and lets it drop again to the position, referred to in the red tracings Fig. 2, when the staves are turned, and operated in the same manner as before which completes them.

I do not claim the reciprocating plane having reversed bits or the manner of its motion but I do claim—

The combination of the reciprocating plane A, having reversed bits $c$, $c'$ and the motion referred to, and the carriage D, with the inclined ways E, E' constructed, arranged and operated in the manner and for the purpose shown and described.

ERASMUS M. PITMAN.

Witnesses:
SYLVESTER ALLEN,
A. J. SCHOOLCRAFT.